United States Patent
Wein

(10) Patent No.: US 10,124,668 B2
(45) Date of Patent: Nov. 13, 2018

(54) CENTER DIFFERENTIAL GEAR ASSEMBLY FOR A DRIVE DEVICE OF A MOTOR VEHICLE

(71) Applicant: AUDI AG, Ingolstadt (DE)

(72) Inventor: Michael Wein, Seubersdorf (DE)

(73) Assignee: AUDI AG, Ingolstadt (DE)

( * ) Notice: Subject to any disclaimer, the term of this patent is extended or adjusted under 35 U.S.C. 154(b) by 22 days.

(21) Appl. No.: 14/894,431

(22) PCT Filed: May 21, 2014

(86) PCT No.: PCT/EP2014/001368
§ 371 (c)(1),
(2) Date: Nov. 27, 2015

(87) PCT Pub. No.: WO2014/191091
PCT Pub. Date: Dec. 4, 2014

(65) Prior Publication Data
US 2016/0129784 A1    May 12, 2016

(30) Foreign Application Priority Data
May 29, 2013   (DE) .................. 10 2013 009 081

(51) Int. Cl.
*B60K 6/365* (2007.10)
*B60K 17/16* (2006.01)
(Continued)

(52) U.S. Cl.
CPC ............ *B60K 17/165* (2013.01); *B60K 6/387* (2013.01); *B60K 6/52* (2013.01); *B60K 17/346* (2013.01);
(Continued)

(58) Field of Classification Search
CPC .......................... B60K 6/365; F16H 2200/021
See application file for complete search history.

(56) References Cited

U.S. PATENT DOCUMENTS

| 4,479,404 A * | 10/1984 | Stockton ................... F16H 3/66 |
| | | 475/149 |
| 8,565,973 B2 | 10/2013 | Wein |
| 8,731,759 B2 | 5/2014 | Wein et al. |
| 8,738,266 B2 | 5/2014 | Kruse et al. |

(Continued)

FOREIGN PATENT DOCUMENTS

| AT | 006 377 U1 | 9/2003 |
| DE | 10 2008 029 287 A1 | 12/2009 |

(Continued)

OTHER PUBLICATIONS

International Search Report issued by the European Patent Office in International Application PCT/EP2014/001368.

*Primary Examiner* — Tisha D Lewis
(74) *Attorney, Agent, or Firm* — Henry M. Feiereisen LLC

(57) ABSTRACT

A center differential gear assembly for a drive device of a motor vehicle includes a driveshaft, a first driven shaft for a front axle of the motor vehicle, a second driven shaft for a rear axle of the motor vehicle, and a differential gear designed as a planetary gear train. A clutch device operatively connects an electric machine in a first shift position via the differential gear with the second driven shaft and in a second shift position directly with the second driven shaft. A superposition gear includes a first planetary gear train and a second planetary gear, with a ring gear of the first planetary gear train and a ring gear of the second planetary gear train being operatively connected in fixed rotative engagement with one another.

9 Claims, 1 Drawing Sheet

(51) Int. Cl.
  B60K 6/387  (2007.10)
  B60K 6/52  (2007.10)
  F16H 48/36  (2012.01)
  B60K 17/346  (2006.01)

(52) U.S. Cl.
  CPC ....... *F16H 48/36* (2013.01); *F16H 2048/364* (2013.01); *Y02T 10/6265* (2013.01)

(56) References Cited

U.S. PATENT DOCUMENTS

| | | | | |
|---|---|---|---|---|
| 2003/0234124 A1* | 12/2003 | Pecnik | ................... | B60K 6/26 180/65.25 |
| 2014/0235394 A1* | 8/2014 | Smetana | ................ | B60K 6/365 475/151 |
| 2015/0111681 A1* | 4/2015 | Wirth | ....................... | B60K 1/00 475/150 |

FOREIGN PATENT DOCUMENTS

| | | | | |
|---|---|---|---|---|
| DE | 10 2008 044 035 A1 | 5/2010 | | |
| DE | 10 2010 036 240 A1 | 3/2012 | | |
| DE | 10 2011 007 265 A1 | 10/2012 | | |
| DE | 10 2011 007 268 A1 | 10/2012 | | |
| EP | 1 637 381 A2 | 3/2006 | | |
| JP | 2003025862 A * | 1/2003 | ............. | B60K 17/35 |
| JP | 2005-170159 A | 6/2005 | | |
| JP | 2007-246056 A | 9/2007 | | |
| JP | 2012-111394 A | 6/2012 | | |
| WO | WO 2006/029434 A2 | 3/2006 | | |
| WO | WO-2006046018 A1 * | 5/2006 | ......... | B60K 17/3462 |
| WO | WO 2012/079827 A1 | 6/2012 | | |

\* cited by examiner

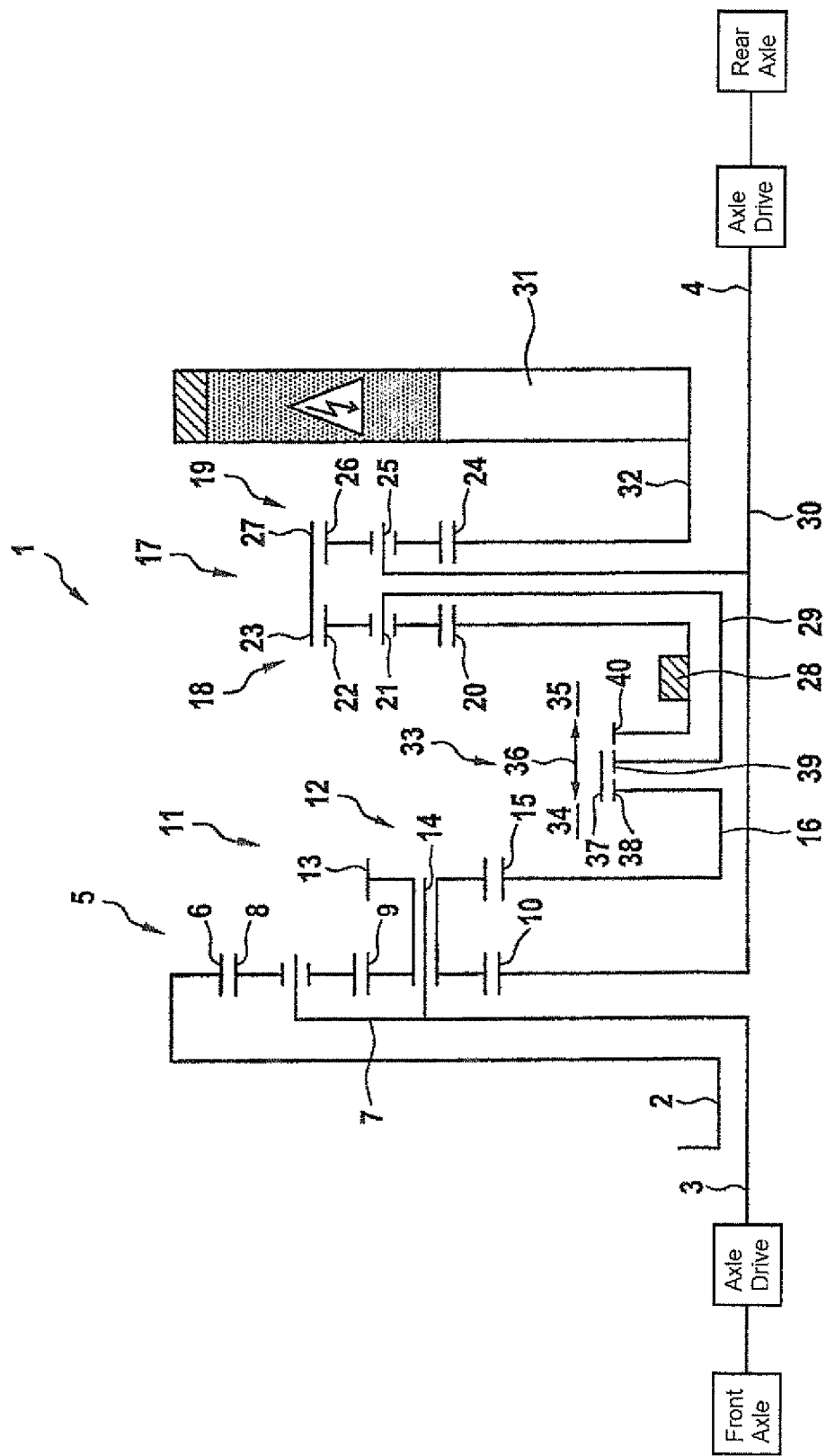

CENTER DIFFERENTIAL GEAR ASSEMBLY FOR A DRIVE DEVICE OF A MOTOR VEHICLE

CROSS-REFERENCES TO RELATED APPLICATIONS

This application is the U.S. National Stage of International Application No. PCT/EP2014/001368, filed May 21, 2014, which designated the United States and has been published as International Publication No. WO 2014/191091 and which claims the priority of German Patent Application, Serial No. 10 2013 009 081.4, filed May 29, 2013, pursuant to 35 U.S.C. 119(a)-(d).

BACKGROUND OF THE INVENTION

The invention relates to a center differential gear assembly for a drive device of a motor vehicle, including a driveshaft, a first driven shaft for a front axle of the motor vehicle, and a second driven shaft for a rear axle of the motor vehicle, as well as including a differential gear designed as a planetary gear train.

The center differential gear assembly is provided to distribute a driving torque, supplied or provided via the driveshaft, to both driven shafts, that is to the first driven shaft and the second driven shaft. The first driven shaft is hereby operatively connected for example with the front axle of the motor vehicle and the second driven shaft is operatively connected with the rear axle of the motor vehicle, in particular directly operatively connected. As an alternative, a reverse configuration may also be provided, in which the first driven shaft is associated to the rear axle and the second driven shaft is associated to the front axle. The differential gear, which establishes the operative connection of the driveshaft and the two driven shaft with one another, is configured as a planetary gear train.

SUMMARY OF THE INVENTION

It is now object of the invention to propose a compact center differential gear assembly for a drive device of a motor vehicle to enable efficient distribution of the driving torque to both driven shafts with differential compensation and recuperation of a torque provided via the driven shafts at the same time.

This is realized in accordance with the invention by a center differential gear which includes a driveshaft, a first driven shaft for a front axle of the motor vehicle, a second driven shaft for a rear axle of the motor vehicle, a differential gear designed as a planetary gear train, and a clutch device which operatively connects an electric machine in a first shift position via the differential gear and in a second shift position directly with the second driven shaft. In the first shift position, the electric machine is provided to distribute the driving torque to both driven shafts. The differential gear is thus configured in this case as active center differential gear. Conversely, in the second shift position, the electric machine is directly, i.e. not or at least not exclusively via the differential gear, operatively connected with the second driven shaft.

Thus, with the assistance of the electric machine, an additional driving torque can be applied onto the second driven shaft, in particular to additionally accelerate the motor vehicle, or, as an alternative, to carry out a recuperation, in which the electric machine is operated as generator. Thus, at least the second driven shaft is slowed down by the electric machine during recuperation and respective kinetic energy is converted into electric energy. Such a center differential gear assembly is especially useful for a mild hybrid motor vehicle, because the electric machine does not have to generate a particularly high power. With the assistance of the described center differential gear assembly, the combination of an electric superposition differential and a hybrid function for an active center distribution is realized in a particularly compact construction.

According to a particularly preferred configuration of the invention, provision is made for a ring gear of the differential gear in direct operative connection with the driveshaft, a planet carrier of the differential gear in direct operative connection with the first driven shaft, and a sun wheel of the differential gear in direct operative connection with the second driven shaft, with at least one outer planet wheel in mesh with the ring gear and at least one inner planet wheel in mesh with both the outer planet wheel and the sun wheel being supported on the planet carrier. The term "operative connection" is to be understood as not being applied via the differential gear but that the respective element of the differential gear is operatively connected in fixed rotative engagement with the respective shaft.

The embodiment of the differential gear used here is characterized in that several meshing planet wheels, that is the outer planet wheel and the inner planet wheel, are provided. As the outer planet wheel meshes with the ring gear and the inner sun wheel meshes with the sun wheel, an operative connection is realized via the two planet wheels between the ring gear and the sun wheel. Both, the outer planet wheel and the inner planet wheel are rotatably mounted on the same planet carrier. The outer planet wheel is hereby positioned in relation to a rotation axis of the planet carrier further to the outside in radial direction than the inner planet wheel. The outer planet wheel and the inner planet wheel jointly form a planet wheel pair.

Of course, any number of such planet wheel pairs may be provided. For example, only a single planet wheel pair, preferably however several, in particular three, planet wheel pairs are provided. Such a differential gear represents at first a perfectly normal gear for operative connection of the driveshaft with the two driven shafts, with a differential function being realized.

According to a refinement of the invention, provision is made for the differential gear to include a first gear part of a reduced coupling mechanism, and a second gear part of the reduced coupling mechanism is associated to an intermediate gear having a sun wheel provided on an intermediate shaft. The term "reduced coupling mechanism" is to be understood within the scope of the described center differential gear assembly as two planetary gear trains operatively connected via their planet carriers. The first gear part of the reduced coupling mechanism is thus formed by the inner planet wheel of the differential gear for example. The second gear part is connected in fixed rotative engagement with the inner planet wheel and rotatably supported in relation to the same axis of the planet carrier of the differential gear. The second gear part co-forms the intermediate gear. The sun wheel of this intermediate gear is operatively connected in fixed rotative engagement with the intermediate shaft.

Thus, the reduced coupling mechanism includes the first gear part which comprises in particular the ring gear, the planet carrier with the outer planet wheel and the inner planet wheel as well as the ring gear of the differential gear, and the second gear part which has a planet wheel and the sun wheel of the intermediate gear. Therefore, not only both driven shafts are coupled to the driveshaft via the reduced coupling mechanism but in addition also the intermediate shaft.

According to a particularly preferred configuration of the invention, provision is made for a superposition gear comprised of a first planetary gear train and a second planetary gear train, with the ring gears of the two planetary gear trains being operatively connected in fixed rotative engagement with one another. The electric machine can be directly operatively connected with the differential gear and/or the second driven shaft via the superposition gear. The first planetary gear train of the superposition gear is hereby associated to the differential gear, and the second planetary gear train is associated to the second driven shaft. The ring gears of both planetary gear trains are operatively connected with one another in fixed rotative engagement for example or are formed by a common ring gear associated to both planetary gear trains.

According to a preferred configuration of the invention, a sun wheel of the first planetary gear train is stationary. The sun wheel of the first planetary gear train of the superposition gear is thus arranged fixed in place. For this purpose, it is secured, for example, to a housing of the center differential gear assembly.

According to a further configuration of the invention, a planet carrier of the first planetary gear train is operatively connected in fixed rotative engagement with a first input shaft of the superposition gear. The superposition gear includes the first input shaft, a second input shaft, and an output shaft, with the output shaft being operatively connected in fixed rotative engagement for example with the electric machine and the second input shaft being operatively connected in fixed rotative engagement with the second driven shaft.

According to a refinement of the invention, a sun wheel of the second planetary gear train is operatively connected in fixed rotative engagement with the electric machine. This sun wheel thus represents the output shaft of the superposition gear or is directly operatively connected therewith. The operative connection of the sun wheel to the electric machine is realized or can be realized via the output shaft. Of course, the sun wheel may also be, as an alternative, part of the electric machine so that therefore there is no need for a separate output shaft but is present only in a figurative sense.

According to a preferred refinement of the invention, a planet carrier of the second planetary gear train is operatively connected in fixed rotative engagement with a second input shaft of the superposition gear, with the second input shaft being in operative connection in fixed rotative engagement with the second driven shaft or at least forms the driven shaft in part. As already described above, the second input shaft is connected with the second driven shaft. As an alternative, the second input shaft may form the second driven shaft at least in part. The second input shaft is connected to the planet carrier of the second planetary gear train of the superposition gear. An operative connection of the electric machine and the second driven shaft may also be realized via the second planetary gear train. As already described above, analogous thereto, there may an operative connection of the electric machine to the differential gear via the first input shaft and thus the first planetary gear train of the superposition gear.

According to a preferred refinement of the invention, the intermediate shaft in the first shift position of the clutch device is operatively connected in fixed rotative engagement with the first input shaft. As an alternative or in addition, the first input shaft can be fixed in place in the second shift position of the clutch device. The clutch device thus has two shift positions, that is the first shift position and the second shift position. The clutch device impacts in particular the first input shaft of the superposition gear. In the first shift position, the clutch device is operatively connected directly, i.e. in fixed rotative engagement, with the first input shaft. This means that the planet carrier of the first planetary gear train has the same rotation speed as the sun wheel of the intermediate gear.

When, on the other hand, the second shift position of the clutch device is set, the first input shaft is stationary. Because, as has already been described above, it is preferred that the sun wheel of the first planetary gear train is also stationary, the first planetary gear train is completely blocked in the second shift position, so that its ring gear is stationary. This means that as a consequence of the fixed ring gear, there is a direct operative connection between the electric machine and the second input shaft or the second driven shaft via the second planetary gear train of the superposition gear.

BRIEF DESCRIPTION OF THE DRAWING

An embodiment of the invention will now be described in greater detail with reference to the drawing, without limitation of the invention. Hereby, the sole FIGURE shows a schematic illustration of a center differential gear assembly for a drive device of a motor vehicle.

DETAILED DESCRIPTION OF PREFERRED EMBODIMENTS

The FIGURE shows a schematic illustration of a center differential gear assembly 1, as it finds application for example for a drive device of a motor vehicle. The center differential gear assembly 1 has a driveshaft 2, via which a drive unit, not shown here, especially an internal combustion engine, is connected to the center differential gear assembly 1. Furthermore, the center differential gear assembly 1 has a first driven shaft 3 and a second driven shaft 4. Connected to the first driven shaft 3 is, for example, a front axle of the motor vehicle, to the second driven shaft 4 a rear axle of the motor vehicle, each via an axle drive for example. The driving torque provided from the drive unit and transmitted via the driveshaft can thus be distributed via the center differential gear assembly 1 to the two driven shafts 3 and 4 and thus to the axles of the motor vehicle.

The center differential gear assembly 1 has a differential gear 5 configured as a planetary gear train. The differential gear 5 or the planetary gear train essentially includes a ring gear 6, a planet carrier 7 to rotatably support an outer planet wheel 8 and an inner planet wheel 9 in mesh with the outer planet wheel, and a sun wheel 10. The ring gear 6 is operatively connected directly with the driveshaft 2. The planet carrier 7 is operatively connected in fixed rotative engagement with the first driven shaft 3, and the sun wheel 10 is operatively connected in fixed rotative engagement with the second driven shaft 4. To transmit a driving torque between the driveshaft 2 and the two driven shafts 3 and 4, the outer planet wheel meshes with the ring gear 6 and the inner planet wheel 9, while the latter is also in mesh with the sun wheel 10. A driving torque applied on the driveshaft 2 is thus distributed via the differential gear 5 to the driven shafts 3 and 4.

The differential gear 5 is a component of a reduced coupling mechanism 11 or includes a first gear part of this coupling mechanism 11. A second gear part of the coupling mechanism 11 is associated to an intermediate gear 12 or is formed by the latter which includes a sun wheel 15 in addition to a planet wheel 12 that is operatively connected in fixed rotative engagement with the inner planet wheel 9 and supported on a common axle 14 of the planet carrier 7. The sun wheel is operatively connected in fixed rotative engagement with an intermediate shaft 16. The reduced coupling mechanism 11 thus includes the differential gear and the intermediate gear 12 and establishes an operative connection between the driveshaft 2, the driven shafts 3 and 4, and the intermediate shaft 16.

In addition to the differential gear 5 and the intermediate gear 12, the center differential gear assembly 1 includes a superposition gear 17 which includes a first planetary gear train 18 and a second planetary gear train 19. The first planetary gear train 18 has a sun wheel 20, a planet carrier 21 with at least one planet wheel 22, and a ring gear 23. Likewise, the second planetary gear train 19 has a sun wheel 24, a planet carrier 25 with at least one planet wheel 26, and a ring gear 27. Both ring gears 23 and 27 are operatively connected with one another in fixed rotative engagement, for example they are formed by a common ring gear.

It is readily apparent that the sun wheel of the first planetary gear train 18 is stationary, for example by a mounting 28, in particular in relation to a housing of the center differential gear assembly 1. The planet carrier 21 of the first planetary gear train 18 is operatively connected in fixed rotative engagement directly with a first input shaft 29 of the superposition gear 17. Likewise, the planet carrier 25 is operatively connected in fixed rotative engagement directly with a second input shaft 30, with the second input shaft 30 being operatively connected in fixed rotative engagement with the second driven shaft 4 or at least forms it in part. The sun wheel 24 of the second planetary gear train 19 is operatively connected in fixed rotative engagement with an electric machine 31, for example via an output shaft 21 of the superposition gear 17.

A clutch device 33 is further associated to the center differential gear assembly 1 to operatively connect the electric machine 31 either—in a first shift position 34—via the differential gear 5 or—in a second shift position 35—directly with the second driven shaft 4. In the first shift position 34, a ring gear 37, which is shiftable for example in direction of the double arrow 36 and can be designated also as a shift sleeve, is arranged such as to mesh with gearwheels 38 and 39. The gearwheel 38 is hereby operatively connected in fixed rotative engagement with the intermediate shaft 16, whereas the gearwheel 39 is operatively connected in fixed rotative engagement with the input shaft 29.

Conversely, when assuming the second shift position, the ring gear 37 meshes with the gearwheel 39 and a gearwheel 40, with the latter being stationary and operatively connected in fixed rotative engagement with the sun wheel 20 of the first planetary gear train 18 of the superposition gear 17, or is fixed in place via the mounting 28. Thus, a fixed rotative engagement of the intermediate shaft 16 and the first input shaft 29 is established in the first shift position 34. Conversely, the first input shaft 29 is stationary in the second shift position 35. Thus, the electric machine 31 is operatively connected in fixed rotative engagement with the second driven shaft 4 via the differential gear 5 in the first shift position, whereas the operative connection is established in the second shift position 35 directly, that is via the second planetary gear train 19.

Thus, the center differential gear assembly 1 operates as an active center differential in the first shift position 34. This means that the driving torque, provided via the driveshaft 2, as the electric machine 31 is respectively operated, can be distributed in a desired manner to the driven shafts 3 and 4. In such an embodiment, it may be provided that a rotation speed error between the two driven shafts 3 and 4 is realized, for example by different gear ratios in the axle drives to which the driven shafts 3 and 4 are associated. Preferably is thus the presence of an axle drive in the operative connection between the driven shaft 3 and the front axle and an axle drive in the operative connection between the driven shaft 4 and the rear axle.

In the event, the axle drives have different gear ratios, the rotation speeds of the driven shafts 3 and 4 differ at a particular speed of the motor vehicle. In this way, the rotation speed error between the driven shafts 3 and 4 is realized. As a result, the electric machine 31 is acted upon by a driving torque and thus powered as soon as the motor vehicle is in motion. This configuration is especially advantageous when an asynchronous machine is used as electric machine because of the absence of loss torques induced by magnets. When using a synchronous machine, especially a permanent-magnet excited synchronous machine, the presence of the loss torque can be used as pre-control torque so that a (slight) shift of the torque between the driven shafts 3 and 4 is realized at all times.

Conversely, in the event, the gear ratios of the axle drives are selected the same, the driven shafts 3 and 4 have normally the same rotation speed at a given speed of the motor vehicle; Thus, no or at best a slight rotation speed error is present. When the electric machine is at a standstill, the driving torque is consequently distributed equally to the driven shafts 3 and 4 and thus, when the electric machine 31 is operated in the one or the other direction, either only the first driven shaft 3 or the second driven shaft is provided with the greater part of the driving torque.

When the rotation speed error is realized, operation of the electric machine 31 as a generator to generate a negative torque enables provision of a greater part of the driving torque to the first driven shaft 3 than to the second driven shaft 4. In order to provide the second driven shaft 4 with the greater part of the driving torque, the electric machine 31 has to be operated as a motor to provide a positive torque.

Of course, through respective selection of the gear ratio, in particular of the axle drives, a reverse embodiment may be realized in which the operation as a generator results in a provision of the greater part of the driving torque for the second driven shaft 4 and operation as a motor results in a provision of the greater part of the driving torque for the first driven shaft 3. This is advantageous because for acceleration more torque should normally be supplied to the rear axle and thus the second driven shaft 4 than to the front axle or the first driven shaft 3. At the same time, particularly preferable is the operation of a torque-vectoring device by which torque can be distributed in a desired manner to the wheels of the rear axle in order to attain a best possible acceleration effect.

Operation of this device requires, however, electric energy and thus strains the on-board electric power supply of the motor vehicle. This can be supported or assisted only with the aid of the generator mode of the electric machine 31, selected for acceleration of the motor vehicle. Ideally, power solely generated by the generator mode is adequate to operate the torque-vectoring device. In particular, the gear ratios of the axle drives are respectively selected.

Of course, also a variant can be realized in which the torque-vectoring device is associated to the front axle and the operation of the electric machine as generator causes more torque to be supplied to the front axle than to the rear axle. Also a variant in which both, the rear axle and the front axle, are each provided with such a torque-vectoring device is possible.

In the second shift position 35, the electric machine 31 is rigidly operatively connected with the second input shaft 30 or the second driven shaft 4, and thus may be used either for provision of an additional driving torque to the second driven shaft 4 or, as an alternative, for recuperation through operation as a generator. The described center differential gear assembly 1 thus provides both the functionality of an active center differential and a hybrid function for a mild hybrid motor vehicle for example.

What is claimed is:

1. A center differential gear assembly for a drive device of a motor vehicle, comprising:
    a driveshaft;
    a first driven shaft operatively connected to a front axle of the motor vehicle so as to supply to the front axle a first torque;
    a second driven shaft operatively connected to a rear axle of the motor vehicle so as to supply to the rear axle a second torque which is higher than the first torque, thereby operating the front and rear axles at different speed ratios so that a rotation speed of the first driven shaft and a rotation speed of the second driven shaft differ;
    a differential gear designed as a planetary gear train;
    a clutch device operatively connecting an electric machine in a first shift position via the differential gear with the second driven shaft and in a second shift position via a superposition gear directly with the second driven shaft;
    the superposition gear comprising a first planetary gear train and a second planetary gear, with a ring gear of the first planetary gear train and a ring gear of the second planetary gear train being operatively connected in fixed rotative engagement with one another; and
    a reduced coupling mechanism having a first gear part which is a component of the differential gear, and a second pear part associated to an intermediate gear having an intermediate shaft and a sun wheel connected to the intermediate shaft.

2. The center differential gear assembly of claim 1, wherein the differential gear has a ring gear in direct operative connection with the driveshaft, a planet carrier in direct operative connection with the first driven shaft, a sun wheel in direct operative connection with the second driven shaft, at least one outer planet wheel in mesh with the ring gear, and at least one inner planet wheel in mesh with both the outer planet wheel and the sun wheel, said inner and outer planet wheels of the differential gear being supported on the planet carrier.

3. The center differential gear assembly of claim 1, wherein the first planetary gear train of the superposition gear has a stationary sun wheel.

4. The center differential gear assembly of claim 1, wherein the second planetary gear train of the superposition gear has a sun wheel which is operatively connected in fixed rotative engagement with the electric machine.

5. The center differential gear assembly of claim 1, wherein the second planetary gear train of the superposition gear has a sun wheel which is operatively connected in fixed rotative engagement with the electric machine, said intermediate shaft being operatively connected in fixed rotative engagement with the first input shaft in the first shift position of the clutch device.

6. The center differential gear assembly of claim 1, wherein one of the axle drives is in operative connection between the first driven shaft and the front axle, and another one of the axle drives is in operative connection between the second driven shaft and the rear axle.

7. A center differential gear assembly for a drive device of a motor vehicle, comprising:
    a driveshaft;
    a first driven shaft operatively connected to a front axle of the motor vehicle so as to supply to the front axle a first torque;
    a second driven shaft operatively connected to a rear axle of the motor vehicle so as to supply to the rear axle a second torque which is higher than the first torque, thereby operating the front and rear axles at different speed ratios so that a rotation speed of the first driven shaft and a rotation speed of the second driven shaft differ;
    a differential gear designed as a planetary gear train;
    a clutch device operatively connecting an electric machine in a first shift position via the differential gear with the second driven shaft and in a second shift position via a superposition gear directly with the second driven shaft; and
    the superposition gear comprising a first planetary gear train and a second planetary gear, with a ring gear of the first planetary gear train and a ring gear of the second planetary gear train being operatively connected in fixed rotative engagement with one another,
    wherein the first planetary gear train of the superposition gear has a planet carrier which is operatively connected in fixed rotative engagement with a first input shaft of the superposition gear.

8. The center differential gear assembly of claim 7, wherein the first input shaft is stationary in the second shift position of the clutch device.

9. A center differential gear assembly for a drive device of a motor vehicle, comprising:
    a driveshaft;
    a first driven shaft operatively connected to a front axle of the motor vehicle so as to supply to the front axle a first torque;
    a second driven shaft for operatively connected to a rear axle of the motor vehicle so as to supply to the rear axle a second torque which is higher than the first torque, thereby operating the front and rear axles at different speed ratios so that a rotation speed of the first driven shaft and a rotation speed of the second driven shaft differ;
    a differential gear designed as a planetary gear train;
    a clutch device operatively connecting an electric machine in a first shift position via the differential gear with the second driven shaft and in a second shift position via a superposition gear directly with the second driven shaft; and
    the superposition gear comprising a first planetary gear train and a second planetary gear, with a ring gear of the first planetary gear train and a ring gear of the second planetary gear train being operatively connected in fixed rotative engagement with one another,
    wherein the second planetary gear train of the superposition gear has a planet carrier which is operatively connected in fixed rotative engagement with a second input shaft of the superposition gear, said second input shaft being operatively connected in fixed rotative engagement with the second driven shaft or at least forms part of the second driven shaft.

\* \* \* \* \*

UNITED STATES PATENT AND TRADEMARK OFFICE
CERTIFICATE OF CORRECTION

PATENT NO. : 10,124,668 B2  
APPLICATION NO. : 14/894431  
DATED : November 13, 2018  
INVENTOR(S) : Michael Wein Page 1 of 1

It is certified that error appears in the above-identified patent and that said Letters Patent is hereby corrected as shown below:

In the Claims

In Column 7, Claim 1, Line 41: replace "pear part" with --gear part--.
In Column 8, Claim 9, Line 45: after "shaft" delete the word "for".

Signed and Sealed this
Third Day of September, 2019

Andrei Iancu
*Director of the United States Patent and Trademark Office*